United States Patent [19]

Lauck

[11] 4,085,259
[45] Apr. 18, 1978

[54] LIGHT METAL GALVANIC ELEMENT

[75] Inventor: Helmüt Lauck, Glashutten, Germany

[73] Assignee: Varta Batterie Aktiengesellschaft, Germany

[21] Appl. No.: 669,680

[22] Filed: Mar. 23, 1976

[30] Foreign Application Priority Data

Apr. 16, 1975 Germany .............................. 2516704

[51] Int. Cl.² ............................................. H01M 4/48
[52] U.S. Cl. ..................................... 429/194; 429/218
[58] Field of Search ......................... 429/218, 194, 197

[56] References Cited

U.S. PATENT DOCUMENTS

| 2,828,350 | 3/1958 | Rhyne | 429/218 |
| 3,506,492 | 4/1970 | Buzzelli et al. | 429/218 |
| 3,929,504 | 12/1975 | Gore et al. | 429/194 |

Primary Examiner—John H. Mack
Assistant Examiner—H. A. Feeley
Attorney, Agent, or Firm—Weiser, Stapler & Spivak

[57] ABSTRACT

In a cell which uses a light metal negative electrode, the positive electrode mass has an electrochemically reducible component which is mainly $Bi_2O_3$ and the electrolyte is a conductive salt dissolved in a mixture composed mainly of propylene carbonate and dimethoxyethane.

9 Claims, 1 Drawing Figure

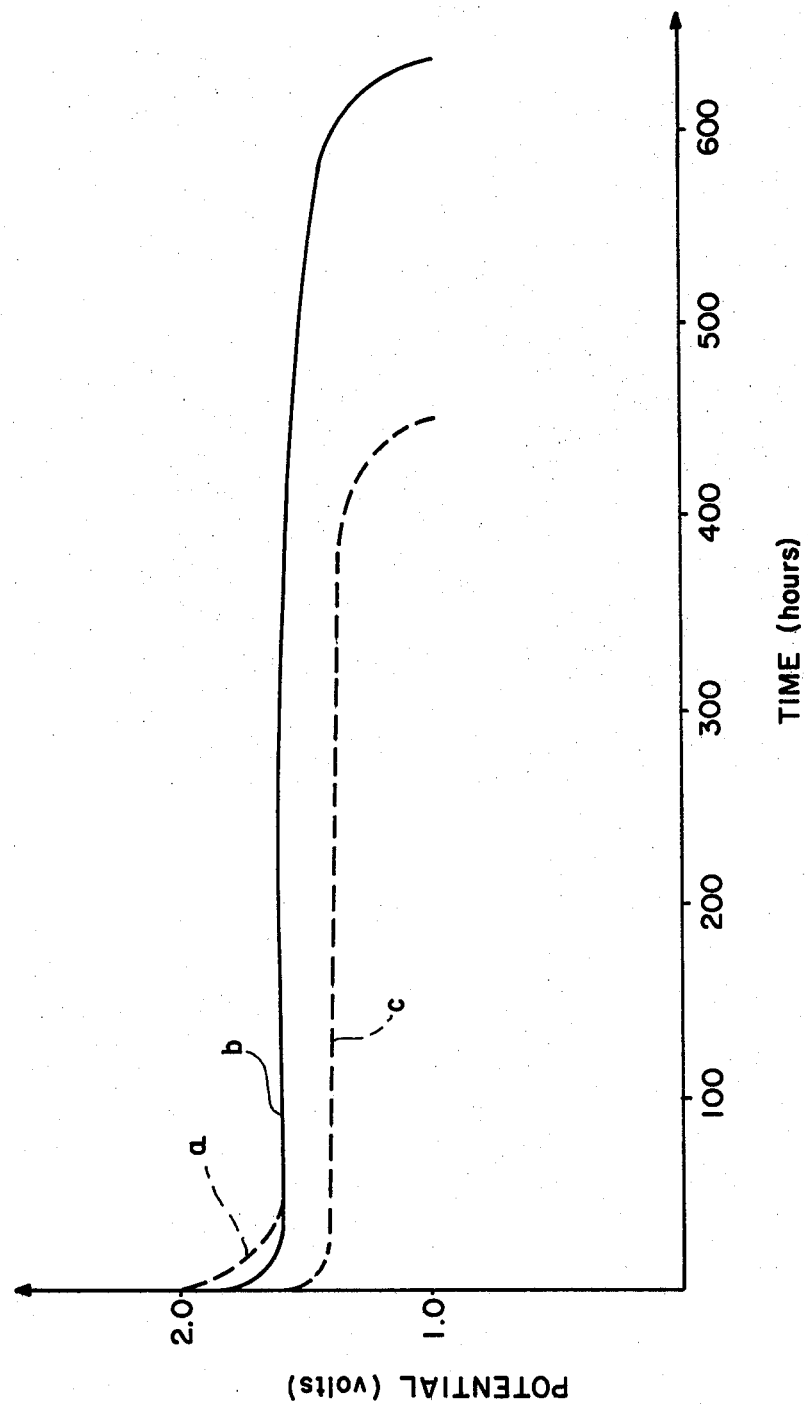

LIGHT METAL GALVANIC ELEMENT

The invention relates to a galvanic element having a negative electrode of light metal, non-aqueous electrolyte, and a positive electrode.

Because of their low atomic weight and high standard potential, light metals have exceptionally high energy density when used as electrode material for galvanic cells. In this regard, lithium is particularly suitable as an electrode material.

The high chemical reactivity of light metals requires, on the one hand, that a non-aqueous electrolyte be used. On the other hand, it places a special burden on the selection of the positive electrode material. Most materials are too easily soluble in the electrolyte, thereby significantly reducing the useful capacity of such an electrode after storage.

In other materials, the current-producing electrochemical reaction is so strongly inhibited that high current density discharge becomes impossible.

By way of illustration, U.S. Pat. No. 3,415,687 mentions bismuth oxides as depolarizers for galvanic cells having a negative lithium electrode, in addition to other organic compounds and metallic oxides. For electrolyte salts, halogen compounds dissolved in methyl acetate are disclosed.

Such cells have only limited shelf life and are not compatible with Leclanche' type cells, because of the undesirably high potential which their preferred embodiments develop. Furthermore, methyl acetate has a very low boiling point of about 57° C. It is quite possible for such a temperature to be reached during storage and during operation of the cells. This causes a very high vapor pressure in hermetic cells. Operation of hermetic cells of this type can therefore readily lead to loss of hermeticity. The low ion conductivity of this electrolyte allows only for loading at low current densities and further causes low utilization of the electrochemically active electrode mass, due to the fact that the cell potential quickly drops below the useful lower limit.

Accordingly, it is an object to provide a galvanic element of high energy density having a negative electrode of light metal.

It is another object to provide such a galvanic element having a negative electrode of lithium.

It is still another object to provide such an element which exhibits a cell potential that remains as constant as possible while under load, which is interchangeable with other cells, and which operates reliably over wide temperature ranges.

These and other objects which will appear are achieved in accordance with the invention by making the electrochemically reducible component of the positive electrode mass primarily $Bi_2O_3$, while the electrolyte is composed of a solution of a conductive salt in a mixture composed principally of propylene carbonate and 1,2 dimethoxyethane.

A galvanic cell having a negative lithium electrode, $Bi_2O_3$ as the electrochemically reactive material of the positive electrode, and an electrolyte of a conductive salt dissolved in propylene carbonate and dimethoxyethane is particularly advantageous because such a cell operates reliably over wide temperature ranges and exhibits good storage life and also is equivalent to Leclanche cells in its cell potential especially during discharge. For the electrolyte, a particularly suitable substance is an approximately one molar solution of lithium perchlorate in a solution of propylene carbonate and 1,2 dimethoxyethane in the volume relationship of approximately 40 to 60. For cells embodying the invention and intended to be used in widely varying temperatures, the following electrolyte is especially suitable. It is composed of 25 to 35% by volume of propylene carbonate, about 30 to 40% by volume of 1,2 dimethoxyethane, and about 30 to 40% by volume of tetrahydrofuran. Preferably the constituents propylene carbonate, 1,2 dimethoxyethane, and tetrahydrofuran are present in the volumetric relationship of about 30:35:35. In this mixture, there is dissolved lithium perchlorate in a concentration of about 0.8 to 1.2 mole per liter, and preferably 1 mole per liter.

Galvanic cells with this electrolyte are remarkable for their very good shelf life. Over a storage period of one year no capacity degradation was apparent. The active mass is utilized to well beyond 80%. Even at temperatures of minus 20° C, the active mass is still utilized to the extent of 70%, and the potential remains constant during the entire discharge period. Moreover, the electrolyte has high boiling point and low vapor pressure.

In galvanic cells having a positive electrode of $Bi_2O_3$, small proportions of higher oxides are conducive, during discharge, to initially higher discharge potentials which gradually diminish. A small addition of $Sb_2O_3$ to the positive electrode reduces this initially high discharge potential. This is particularly desirable for the operation of sensitive electronic instruments.

To produce a positive electrode, $Bi_2O_3$ is mixed with about 5 to 30% by weight $Sb_2O_3$, and preferably 15% by weight of $Sb_2O_3$. To obtain good electronic conductivity, there is mixed into this material between about 2 and 7% by weight, and preferably about 4.5% by weight of graphite. Aside from $Sb_2O_3$, additional finely divided metallic bismuth is also useful to reduce the initially high potential. To that end, the $Bi_2O_3$ mass is stirred together with about 0.5 to 5% by weight and preferably about 2.5% by weight bismuth in powder form, with grain size less than 60 microns, and the resultant material is then heated in an inert gas atmosphere at a temperature of about 600° C for about 1 hour. By this procedure the higher oxides of bismuth, which are responsible for the high initial potential, are reduced.

It is also possible to reduce these higher oxides in the $Bi_2O_3$ electrode electrochemically using a current of about 2 ma per square centimeter over a period of about five hours.

Electrode material which has been so treated is also mixed with about 2 to 7% and preferably about 4.5% by weight of graphite to enhance its electrical conductivity.

For further details, reference is made to the discussion which follows in the light of the accompanying drawing, whose single FIGURE shows the discharge characteristics of various types of button cells of equal capacity but different construction.

Specifically this FIGURE shows the variation in potential of such cells as a function of discharge time. Curve $a$ shows this relationship for a cell having a negative electrode of lithium, a positive electrode mainly of $Bi_2O_3$ with electrolyte consisting of a mixture of one mole per liter lithium perchlorate in a mixture of propylene carbonate, 1,2 dimethoxyethane and tetrahydrofuran in a volumetric relationship of approximately 30 to 35 to 35.

Curve *a* shows the discharge potential (in volts) as a function of discharge time (in hours) at a constant discharge current of 1.5 ma and at room temperature, for a button cell using pure $Bi_2O_3$ as the positive electrode mass. The gradual voltage drop at the beginning of discharge is clearly indicated. A different indication is provided by curve *b*, which corresponds to a similar button cell having a $Bi_2O_3$ electrode with an additive of about 2.5% by weight of metallic bismuth in powder form. This curve *b* shows that the initial voltage drop is conspicuously reduced for discharge conditions which are otherwise the same as in curve *a*.

Finally, curve *c* shows the discharge characteristics of a cell with an additive of bismuth at a temperature of minus 20° C and a discharge current of 1.5 ma. Under these conditions, too, the initial voltage drop is scarcely noticeable. In addition, at a temperature of minus 20° C, about 70% of the capacity available at room temperature is still effective.

The mechanical strength required in the processing of the positive electrode mass is provided by the addition of about 0.3 to 0.7% by weight and preferably about 0.5% by weight of polytetrafluoroethylene. The electrode mass is soaked for several hours in the electrolyte solution indicated, and only a small quantity of electrolyte is introduced in the cell container. In this manner the electrolyte is fixated mainly in the positive electrode mass.

Galvanic cells embodying the invention are characterized by very good shelf life. They are capable of delivering high current densities over wide temperature ranges. Even at high current loads the cell potential remains substantially constant during the entire discharge period. By virtue of their potential of 1.5 volts they are interchangeable with known Leclanche cells. Compared to Leclanche cells they exhibit 4 to 5 times higher energy density.

I claim:

1. A primary galvanic cell having a negative electrode of light metal, a non-aqueous fluid electrolyte, and a positive electrode and characterized in that:

the positive electrode has a mass having an electrochemically reducible component consisting mainly of $Bi_2O_3$, and including additives of about 5 to 30% $Sb_2O_3$, or about 0.5 to 5% finely divided metallic bismuth, and about 2 to 7% graphite, and about 0.3 to 0.5% polytetrafluorethylene, all by weight, the remainder being substantially all $Bi_2O_3$, and in that the electrolyte comprises a solution of a conductive salt in a mixture composed primarily of polypropylene carbonate and 1,2 dimethoxyethane.

2. The cell of claim 1, wherein the additive of $Sb_2O_3$ is present in proportions of preferably about 15% by weight.

3. The cell of claim 1, wherein the additive of finely divided metallic bismuth is present in proportions of preferably about 1.5% by weight.

4. The cell of claim 1, wherein the electrolyte consists of an approximately 1 molar solution of $LiClO_4$ in a mixture of propylene carbonate and 1,2 dimethoxyethane in volumetric relationship of about 40 to 60.

5. The cell of claim 1, wherein the electrolyte consists of an approximately 1 molar solution of $LiClO_4$ in a mixture of propylene carbonate, 1,2 dimethoxyethane and tetrahydrofuran in a volumetric relationship of about 30 to 35 to 35.

6. The cell of claim 1, further characterized in that the graphite additive is present in proportions of preferably about 4.5% by weight and the polytetrafluorethylene additive is present in proportions of preferably about 0.5% by weight.

7. In the method of making a primary cell having a negative light metal electrode, an electrolyte, and a positive electrode, the steps of forming a mixture of $Bi_2O_3$ with about 0.5% to 5% by weight of bismuth in finely divided powdered form, which mixture also includes higher oxides of bismuth, heating said mixture in an inert atmosphere at about 600° C for about one hour to reduce the higher bismuth oxides to $Bi_2O_3$, admixing about 2 to 7% by weight of graphite and about 0.3% to 0.5% by weight of polytetrafluorethylene, forming the resultant mass into the positive electrode, and assembling the positive electrode, electrolyte, and negative electrode into the primary cell.

8. The method of claim 7 further comprising soaking the mass in the electrolyte for several hours before introducing it into the cell.

9. The method of claim 7 wherein the mixture comprises in lieu of powdered bismuth about 5 to 30% by weight $Sb_2O_3$.

* * * * *